United States Patent
Kim et al.

(10) Patent No.: US 12,065,520 B2
(45) Date of Patent: Aug. 20, 2024

(54) PHOTOPOLYMERIZATION REACTION SYSTEM INCLUDING AIR INJECTION MODULE FOR PREVENTING CONTAMINATION OF ULTRAVIOLET-TRANSMITTING PLATE

(71) Applicant: LG Chem, Ltd., Seoul (KR)

(72) Inventors: Hyo Jung Kim, Daejeon (KR); Kyung Hoon Min, Daejeon (KR); Eun Jung Joo, Daejeon (KR); Ye Hoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 261 days.

(21) Appl. No.: 17/251,056

(22) PCT Filed: Sep. 11, 2019

(86) PCT No.: PCT/KR2019/011836
§ 371 (c)(1),
(2) Date: Dec. 10, 2020

(87) PCT Pub. No.: WO2020/055168
PCT Pub. Date: Mar. 19, 2020

(65) Prior Publication Data
US 2021/0246233 A1 Aug. 12, 2021

(30) Foreign Application Priority Data
Sep. 14, 2018 (KR) .......... 10-2018-0110124

(51) Int. Cl.
*C08F 2/48* (2006.01)
*B01J 4/00* (2006.01)
(Continued)

(52) U.S. Cl.
CPC ............ *C08F 2/48* (2013.01); *B01J 4/008* (2013.01); *B01J 19/0053* (2013.01);
(Continued)

(58) Field of Classification Search
CPC ............ B01J 19/123; B01J 19/127; B01J 2219/0879; B01J 4/01; B01J 4/008;
(Continued)

(56) References Cited

U.S. PATENT DOCUMENTS 4,446,236 A * 5/1984 Clyde ............... C12M 25/14
435/813
6,309,611 B1 * 10/2001 Tabatabaie-Raissi ..........
C02F 1/325
422/186
(Continued)

FOREIGN PATENT DOCUMENTS

AU     772088 B2 *  4/2004  .......... A01N 1/0215
CN    1585832 A *  2/2005  .......... C23C 16/455
(Continued)

OTHER PUBLICATIONS

Yasuhiro et al. (JPH05304084A, Machine Translation) (Year: 1993).*
(Continued)

*Primary Examiner* — Xiuyu Tai
(74) *Attorney, Agent, or Firm* — Lerner David LLP

(57) ABSTRACT

A photopolymerization reaction system according to an embodiment of the present disclosure may include: a housing; a UV lamp disposed within the housing; a UV light-transmitting plate disposed below the UV lamp; a ventilation part configured to receive supply and discharge therethrough of a first flow of air for heat removal from the UV lamp; and an air injection module configured to inject a second flow of air into the housing between the UV light-transmitting plate and the reactant, the air injection module being configured to prevent the UV light-transmitting plate from being contaminated by by-products generated by a photopolymerization reaction in which a reactant is supplied below the UV light-transmitting plate.

3 Claims, 6 Drawing Sheets

(51) Int. Cl.
  *B01J 19/00* (2006.01)
  *B01J 19/12* (2006.01)
  *C08F 2/01* (2006.01)

(52) U.S. Cl.
  CPC ............ *B01J 19/123* (2013.01); *C08F 2/01* (2013.01); *B01J 2219/00164* (2013.01); *B01J 2219/0869* (2013.01); *B01J 2219/1203* (2013.01)

(58) Field of Classification Search
  CPC .......... B01J 19/0053; B01J 2219/00164; B01J 2219/0869; B01J 2219/1203; B01J 20/3085; B01J 19/22; B01J 20/264; B01J 19/06; B01J 20/3021; B01J 2219/0877; B01J 2219/00123; C08F 2/46; C08F 2/48; C08F 2/01; C08F 2/36; C08F 2/007; C08L 33/00
  See application file for complete search history.

(56) References Cited

U.S. PATENT DOCUMENTS

| | | | | |
|---|---|---|---|---|
| 6,433,343 B1* | 8/2002 | Cimino | ............... | A61M 1/3681 250/455.11 |
| 2001/0050218 A1* | 12/2001 | Tabatabaie-Raissi | .... | B01J 35/06 422/186 |
| 2002/0106313 A1* | 8/2002 | Tabatabaie-Raissi | ........................ | B01D 53/885 422/177 |
| 2008/0180644 A1 | 7/2008 | Matui | | |
| 2010/0113692 A1 | 5/2010 | McGuire, Jr. et al. | | |
| 2011/0123423 A1* | 5/2011 | Ciambelli | ............. | C07C 45/002 568/471 |
| 2016/0051719 A1* | 2/2016 | Watanabe | ............... | A61L 9/205 422/121 |
| 2016/0263553 A1 | 9/2016 | Lee et al. | | |
| 2018/0223146 A1* | 8/2018 | Farid | ......................... | C08F 2/48 |
| 2018/0243722 A1* | 8/2018 | Bouchot | ................. | A61L 27/16 |

FOREIGN PATENT DOCUMENTS

| | | | | |
|---|---|---|---|---|
| CN | 101231936 A | | 7/2008 | |
| CN | 103145884 A | | 6/2013 | |
| CN | 103145885 A | | 6/2013 | |
| CN | 104711163 A | * | 6/2015 | |
| CN | 105061641 A | | 11/2015 | |
| CN | 105111334 A | | 12/2015 | |
| CN | 105143429 A | * | 12/2015 | ............ C12M 21/02 |
| CN | 105682787 A | | 6/2016 | |
| EP | 0727938 B1 | * | 6/2003 | |
| FR | WO 2018165051 A1 | * | 9/2018 | |
| JP | H05304084 A | * | 11/1993 | |
| JP | H05304084 A | | 11/1993 | |
| JP | 2005347409 A | | 12/2005 | |
| JP | 2008186606 A | | 8/2008 | |
| JP | 2013506037 A | * | 2/2013 | |
| JP | 2015074200 A | * | 4/2015 | |
| KR | 20050120728 A | * | 10/2005 | |
| KR | 200406438 Y1 | * | 1/2006 | |
| KR | 20090109066 A | * | 10/2009 | |
| KR | 20150050069 A | | 5/2015 | |
| KR | 20160030711 A | | 3/2016 | |
| KR | 20170091028 A | * | 8/2017 | |
| KR | 101796593 B1 | * | 11/2017 | |
| KR | 20180111309 A | * | 10/2018 | |

OTHER PUBLICATIONS

International Search Report for Application No. PCT/KR2019/011836, mailed Dec. 20, 2019, pp. 1-2.

* cited by examiner

PHOTOPOLYMERIZATION REACTION SYSTEM INCLUDING AIR INJECTION MODULE FOR PREVENTING CONTAMINATION OF ULTRAVIOLET-TRANSMITTING PLATE

CROSS-REFERENCE TO RELATED APPLICATIONS

The present application is a national phase entry under 35 U.S.C. § 371 of International Patent Application No. PCT/KR2019/011836, filed on Sep. 11, 2019, published in Korean, which claims priority from Korean Patent Application No. 10-2018-0110124, filed on Sep. 14, 2018, the disclosures of which are hereby incorporated herein by reference in their entireties.

TECHNICAL FIELD

The present disclosure relates to a photopolymerization reaction system, and more particularly, to a photopolymerization reaction system including an air injection module for preventing contamination of a UV light-transmitting plate.

BACKGROUND ART

Super absorbent polymer (SAP) is a special polymer material with excellent water absorption and water retention, and is widely used for infant and adult diapers, feminine products, etc. Typical methods for producing this super absorbent polymer include a photopolymerization reaction in which polymerization is performed by UV irradiation in the presence of a radical photopolymerization initiator and peroxide.

A photopolymerization reaction is a step that proceeds after the aggregation of a monomeric composition (hereinafter referred to as 'reactant'). When the reactant is supplied to a conventional polymerization reactor 10, as shown in FIG. 1, the polymerization reaction proceeds in a region below a plurality of UV lamp kits 20 disposed on top of the front portion of the polymerization reactor 10. Here, the ultraviolet lamp kit 20 may mean a structure which includes therein a UV lamp and has a lower end coupled to a UV light-transmitting plate for protecting the UV lamp or a UV light-transmitting plate-accommodating frame that accommodates the UV light-transmitting plate.

Meanwhile, in the photoreaction process, water vapor and a small amount of monomer vapor flow are generated as by-products. Supply nozzles 11 for heating heated air and discharge nozzles 12 are formed on the sidewall surface of the polymerization reactor 10 in order to remove the generated by-products, and the by-products move together with the heated air supplied into the polymerization reactor and are discharged to the outside.

However, some by-products are not completely discharged due to unexpected air flow formation in the polymerization reactor 10, and come into contact with the surface of the outer wall, UV light-transmitting plate or the like of the polymerization reactor 10, which has a temperature lower than the internal temperature of the polymerization reactor 10, thus forming scale on the contact surface.

However, the UV light-transmitting plate is inevitably contaminated by the evaporated by-products. Due to the contamination of the UV light-transmitting plate, in some cases, a proper amount of UV light may not reach the reactant, and hence an environment suitable for progress of the polymerization reaction may not be formed.

For this reason, the UV light-transmitting plate needs to be washed periodically. However, in order to wash or replace the UV light-transmitting plate, a cumbersome process of separating the UV lamp kit 20 from the polymerization reactor 10 is necessarily required. In addition, when the UV lamp kit 20 is separated from the polymerization reactor 10, the photoreaction process cannot be continuously performed. That is, after the process is stopped, and then the UV light-transmitting plate is replaced, the process needs to be performed again. Thus, loss costs associated with stopping the process are incurred.

DISCLOSURE

Technical Problem

The present disclosure has been made in order to solve the above-described problem, and an object of the present disclosure is to provide a photopolymerization reaction system including an air injection module for preventing contamination of a UV light-transmitting plate, in which the air injection module is configured to inject air that blocks by-products from evaporating onto the UV light-transmitting plate.

Technical Solution

A photopolymerization reaction system including an air injection module for preventing contamination of a UV light-transmitting plate according to an embodiment of the present disclosure may be a photopolymerization reaction system which includes a UV lamp, a UV light-transmitting plate disposed below the UV lamp, and a ventilation portion through which air for heat removal from the UV lamp is supplied and discharged, and in which a reactant is supplied below the UV light-transmitting plate and a photopolymerization reaction occurs, the photopolymerization reaction system including an air injection module configured to inject a portion of air, supplied through the ventilation portion, between the UV light-transmitting plate and the reactant in order to prevent the UV light-transmitting plate from being contaminated by by-products generated by the photopolymerization reaction.

Advantageous Effects

The photopolymerization reaction system according to the embodiment of the present disclosure has the following effects. Since a portion of air introduced to remove heat from the UV lamp is injected into a space between the UV light-transmitting plate and the reactant by the air injection module and functions as an air curtain, the injected air may block photopolymerization reaction by-products from evaporating to the lower surface of the UV light-transmitting plate, and prevent the UV light-transmitting plate from being contaminated by contact with the by-products.

In addition, since air supplied into the UV lamp kit to remove heat from the UV lamp is injected, energy may be saved, and the system may be simplified in that it does not require separate components that inject air to prevent contamination of the UV light-transmitting plate.

Furthermore, since an air injection function can be embodied by forming an air hole in the frame that accommodates the UV light-transmitting plate and providing a guide unit below the air hole, the photopolymerization reaction system of the present disclosure may be easily applied to an existing photopolymerization reaction system.

BEST MODE

A photopolymerization reaction system according to an embodiment of the present disclosure has the following effects. Since a portion of air introduced to remove heat from the UV lamp is injected into a space between a UV light-transmitting plate and a reactant by an air injection module and functions as an air curtain, the injected air may block photopolymerization reaction by-products from evaporating to the lower surface of the UV light-transmitting plate, and prevent the UV light-transmitting plate from being contaminated by contact with the by-products.

In addition, since air supplied into the UV lamp kit to remove heat from the UV lamp is injected, energy may be saved, and the system may be simplified in that it does not require separate components that inject air to prevent contamination of the UV light-transmitting plate.

Furthermore, since an air injection function can be embodied by forming an air hole in a frame that accommodates the UV light-transmitting plate and providing a guide unit below the air hole, the photopolymerization reaction system of the present disclosure may be easily applied to an existing photopolymerization reaction system.

MODE FOR INVENTION

The present disclosure relates to a photopolymerization reaction system.

Hereinafter, embodiments of the present disclosure will be described in more detail with reference to the accompanying drawings.

In the present specification, the 'UV lamp kit' may be construed to mean a structure including a housing, a UV light-transmitting plate, a frame for accommodating the UV light-transmitting plate, and components included in a space formed by the housing and the UV light-transmitting plate or the frame for accommodating the UV light-transmitting plate, which will be described below.

In the present disclosure, the 'photopolymerization reaction system' may be construed to include all components for a photopolymerization reaction, including a polymerization reactor, UV lamp kits disposed on top of the front portion of the polymerization reactor, and a reactant supplied to the polymerization reactor (or a substrate supplied with the reactant).

Figure 2:
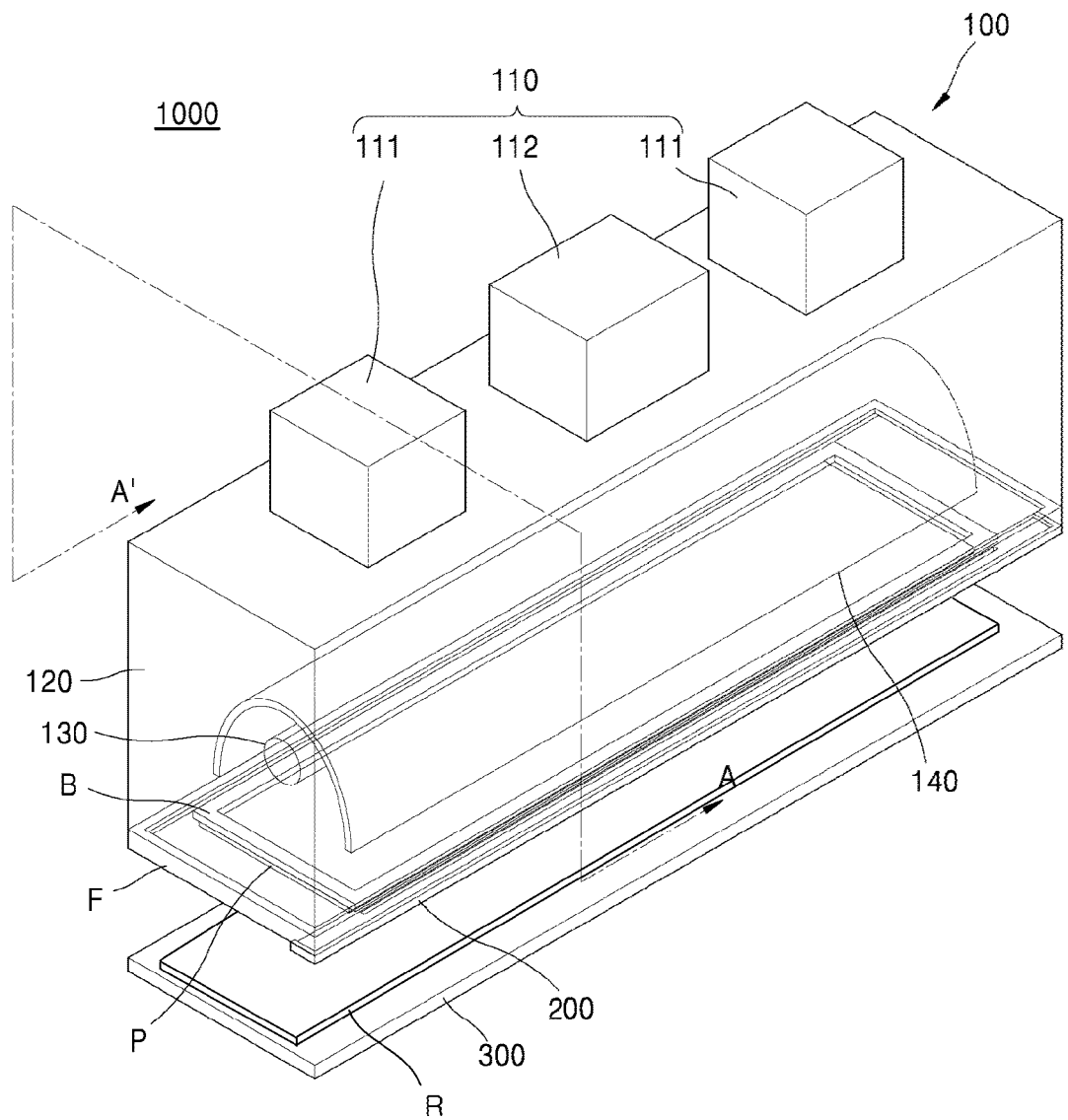
FIG. 2 is a view illustrating a photopolymerization reaction system according to one embodiment of the present disclosure.
Figure 3:
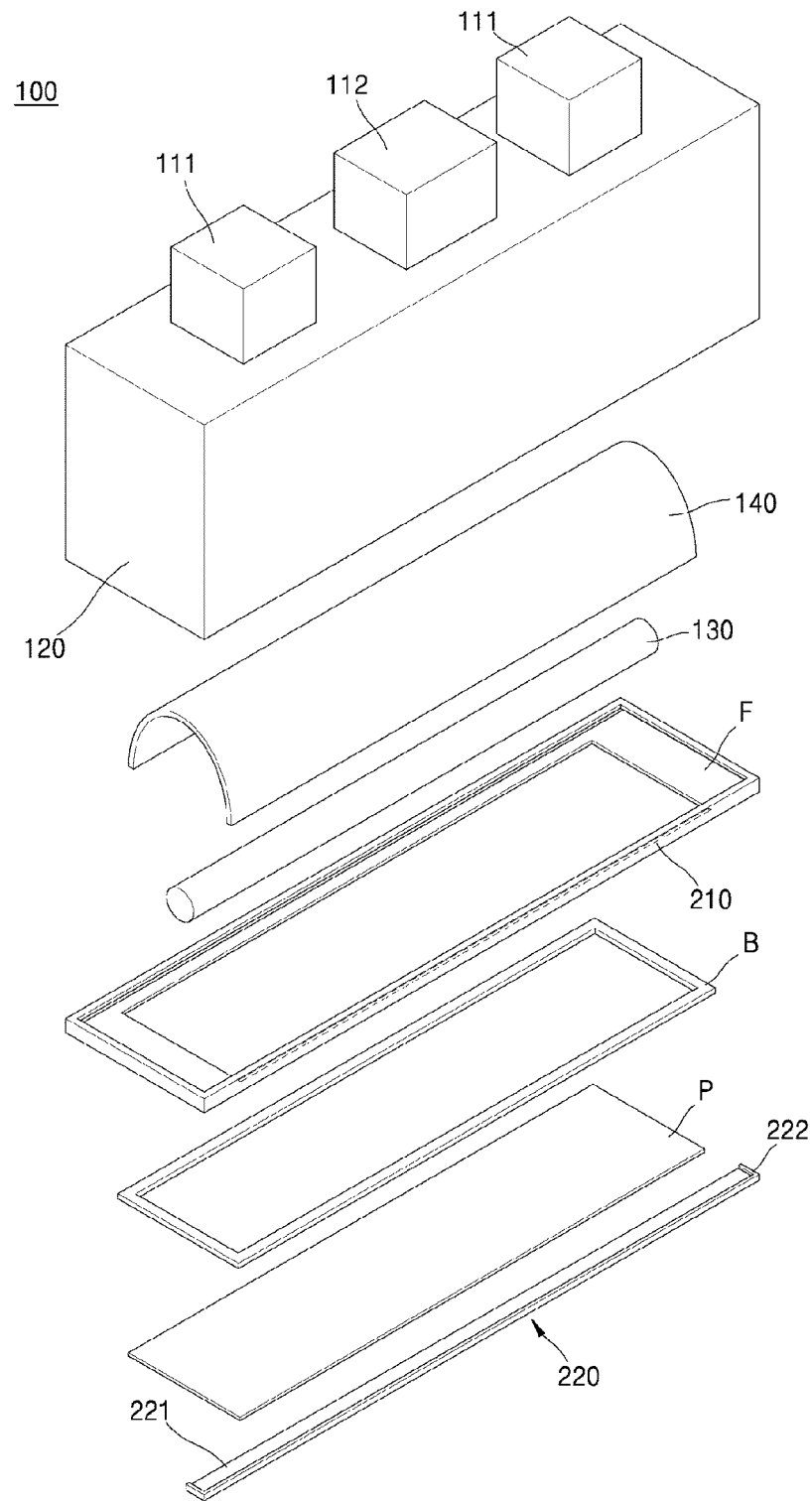
FIG. 3 is an exploded view illustrating each component of the photopolymerization reaction system according to one embodiment of the present disclosure.
Figure 4:
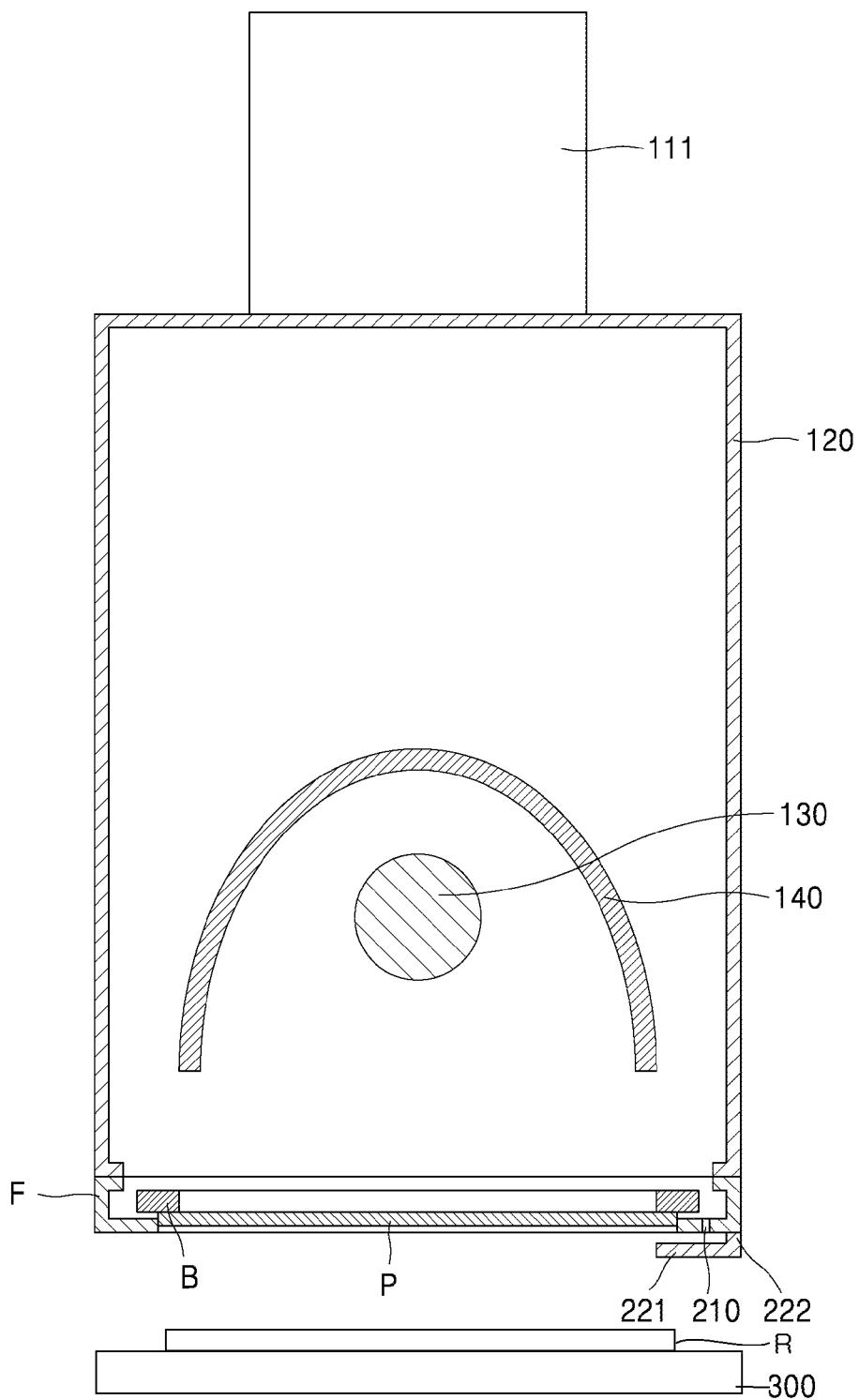
FIG. 4 is a sectional view taken along line A-A' of FIG. 2 illustrating the photopolymerization reaction system according to one embodiment of the present disclosure.
Figure 5:
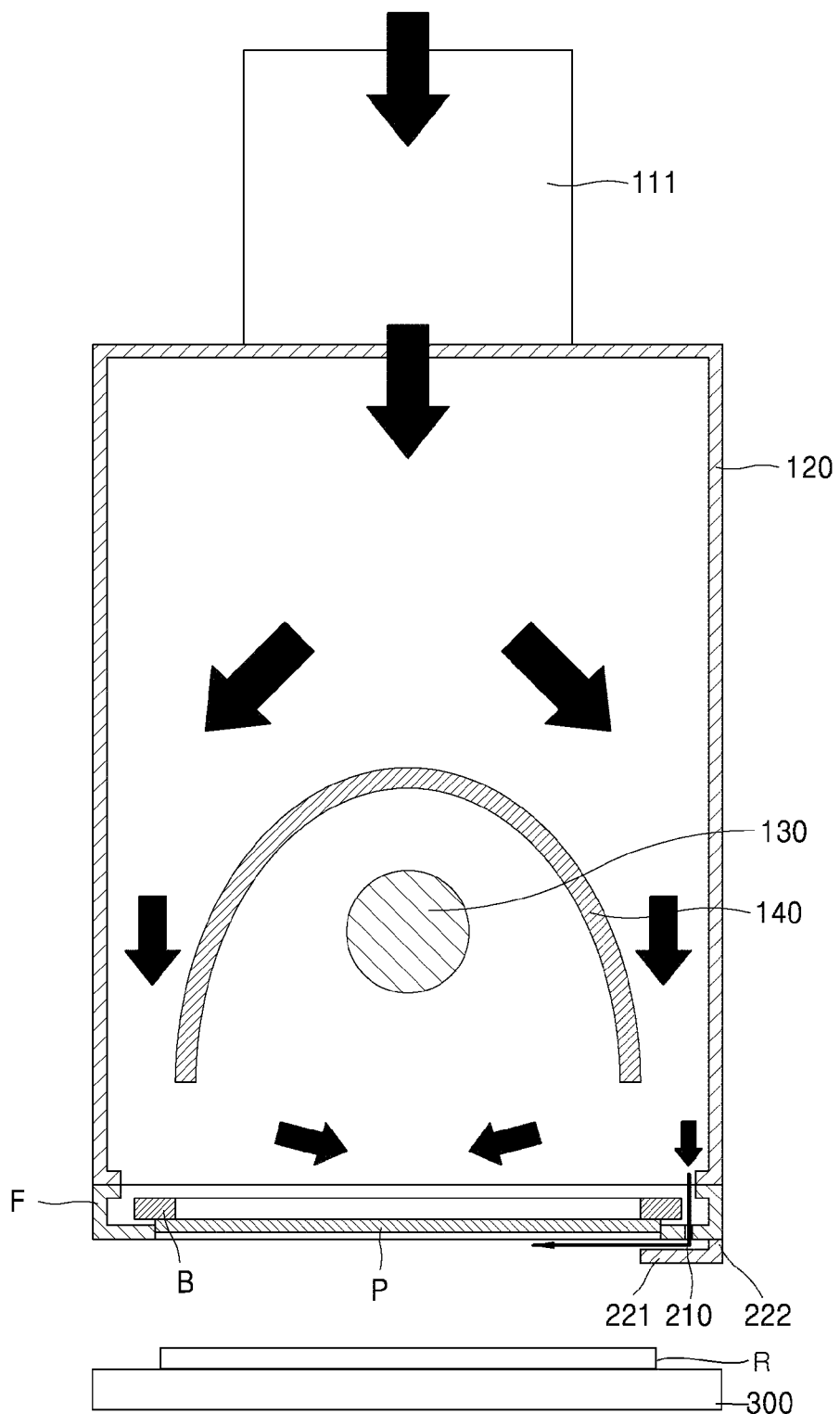
FIG. 5 is a view showing an air flow formed in the photopolymerization reaction system according to one embodiment of the present disclosure.
Figure 6:
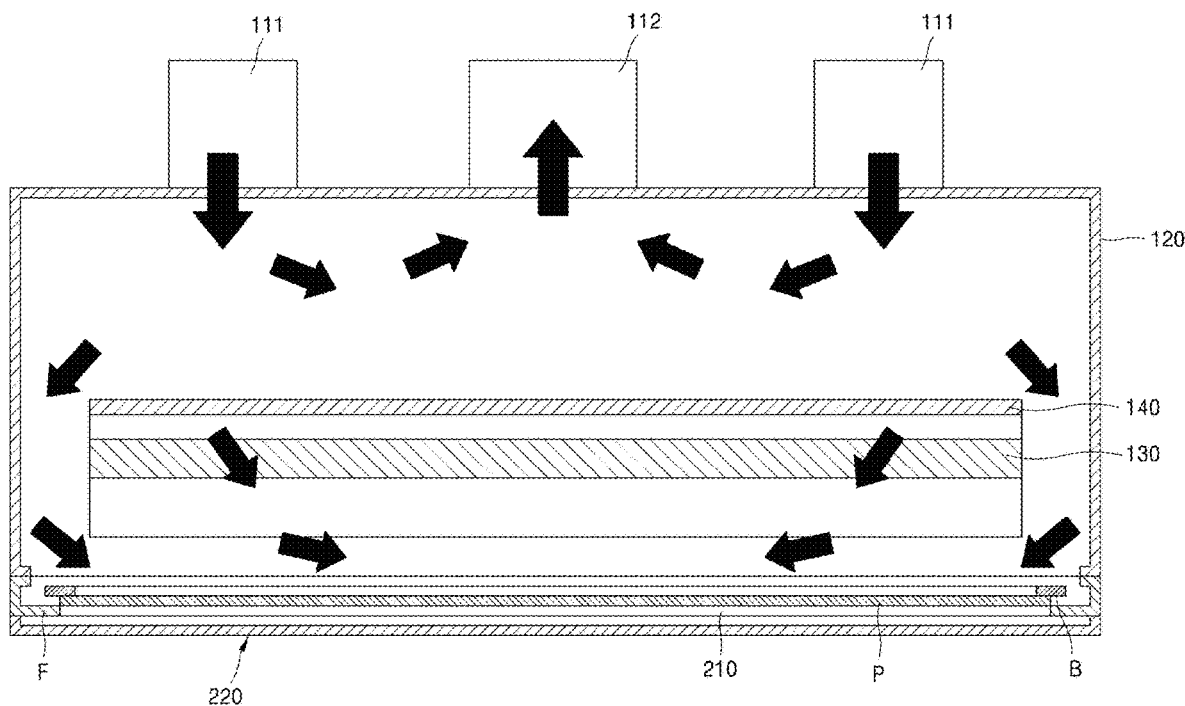
FIG. 6 is a view showing an air flow formed in the photopolymerization reaction system according to one embodiment of the present disclosure.

FIG. 2 is a view illustrating a photopolymerization reaction system according to one embodiment of the present disclosure; FIG. 3 is an exploded view illustrating each component of the photopolymerization reaction system according to one embodiment of the present disclosure; FIG. 4 is a sectional view taken along line A-A' of FIG. 2 illustrating the photopolymerization reaction system according to one embodiment of the present disclosure; FIG. 5 is a view showing an air flow formed in the photopolymerization reaction system according to one embodiment of the present disclosure; and FIG. 6 is a view showing an air flow formed in the photopolymerization reaction system according to one embodiment of the present disclosure. FIGS. 3 and 6 show the photopolymerization reaction system from which a substrate is omitted.

Referring to FIG. 2, a photopolymerization reaction system 1000 according to an embodiment of the present disclosure may include: a UV lamp 130 disposed on top of the front portion of a polymerization reactor; a UV light-transmitting plate P disposed below the UV lamp 130; a ventilation part 110 through which air for heat removal from the UV lamp 130 is supplied and discharged; and an air injection module configured to inject air, supplied through the ventilation part 110, between the UV light-transmitting plate P and a reactant R.

First, referring to FIG. 2, the UV lamp 130 may be provided in a housing 120 having a bottom-opened shape, together with a reflector shade 140 disposed outside the UV lamp 130, in order to change the direction of light, emitted from the UV lamp 130, to a direction to a lower portion at which the UV light-transmitting plate P is disposed. The reflector shade 140 may be made of a material capable of reflecting light, for example, an aluminum material.

Below the UV lamp 130, the UV light-transmitting plate P may be disposed, which is capable of transmitting light emitted from the UV lamp 130 while protecting the UV lamp 130 from contamination. The UV light-transmitting plate P is not particularly limited as long as it is capable of transmitting UV light, emitted from the UV lamp 130, with high transmittance. For example, it may be made of a quartz plate.

In addition, the photopolymerization reaction system 1000 may include a frame F for accommodating the UV light-transmitting plate P. For example, as shown in FIG. 3, the UV light-transmitting plate P may be fixed to a separate frame F by a fixing bracket B. The shape of the frame F is not limited as long as it can accommodate the UV light-transmitting plate P. The housing 120 has a bottom-opened shape, and the frame F for accommodating the UV light-transmitting plate may be coupled to the lower end of the housing 120. The housing 120 and the frame F for accommodating the UV light-transmitting plate may be coupled to each other by a bolt, an adhesive or the like, and the housing 120 and the frame F for accommodating the UV light-transmitting plate may also be formed integrally.

Meanwhile, referring to FIG. 2, in an embodiment of the present disclosure, the UV lamp 130 may include a tube containing, for example, mercury or metal halide material, which emits UV light using electric discharge. During the progress of a photopolymerization reaction, the surface temperature of the UV lamp 130 may increase up to a temperature of about 400° C. to 950° C. Accordingly, as a component for removing heat from the high-temperature UV lamp 130, an air inlet 111 through which external air is supplied, and an air outlet 112 through which air is discharged after heat removal, may be provided in the housing 120.

In addition, in the photopolymerization reaction system 1000, a reactant R is supplied below the UV light-transmitting plate P and a photopolymerization reaction may occur. For example, the reactant R may be supplied onto a substrate 300, and provided and placed below the UV light-transmitting plate P or the frame F that accommodates the UV light-transmitting plate P. Meanwhile, although a polymerization reactor, one component of the photopolymerization reaction system 1000, is not separately shown in FIGS. 2 to 6, it can be seen that the space between a UV lamp kit 100 and the reactant R corresponds to a polymerization reactor region, because the UV lamp kit 100 is disposed on top of the polymerization reactor and the reactant R is provided to the lower portion of the polymerization reactor.

Figure 1:
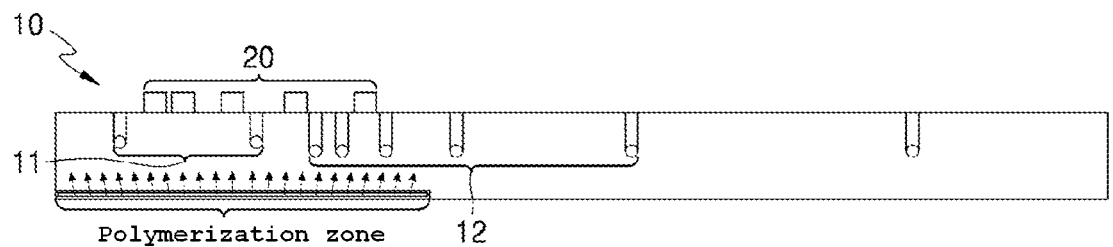
FIG. 1 is a view illustrating a conventional polymerization reactor coupled with UV lamp kits.

Meanwhile, referring to FIG. 1, during the progress of the photopolymerization reaction, by-products, such as water vapor and monomer vapor flow, are generated. Such by-products evaporate toward the UV light-transmitting plate P, and may contaminate the surface of the UV light-transmitting plate P by forming scale on the surface of the UV light-transmitting plate P.

As shown in FIG. 1, a conventional photopolymerization reaction system could cope with the contamination of the UV light-transmitting plate by by-products by supplying air into a polymerization reactor 10 through a supply nozzle 11 formed in the polymerization reactor 10 and discharging the by-products together with the supplied air to the outside through a discharge nozzle 12. However, due to the generation of irregular air flow inside the polymerization reactor 10, there is a limitation in effectively blocking the by-products from evaporating.

Hence, referring to FIG. 2, the photopolymerization reaction system 1000 according to the embodiment of the present disclosure may include the air injection module configured to inject air that is used for heat removal from the UV lamp 130 in order to prevent the UV light-transmitting plate P from being contaminated by non-removed remaining by-products, in addition to air that is supplied directly into the polymerization reactor 1 in order to remove the by-products.

The air injection module may include an air hole 210 and a guide unit 220, and may inject air, supplied through the air inlet 111, between the UV light-transmitting plate P and the reactant.

The air hole 210 may be formed to pass through the upper and lower surfaces of one side (a) of the frame F accommodating the UV light-transmitting plate P, and may discharge a portion of air, introduced into the housing 120 through the air inlet 11, to the bottom of the frame F. In addition, the plurality of air holes 210 may also be formed through the frame F, and the amount and rate of air that is injected between the UV light-transmitting plate P and the reactant R may be controlled by changing the width of the air hole 210.

The guide unit 220 is disposed under the air hole 210 and may guide the injection direction of discharged air. Specifically, the guide unit 220 may be disposed under one side of the frame F having the air hole 210 formed therein, and may guide the injection direction of discharged air so that the air discharged through the air hole 210 may be injected in a direction from the one side (a) to the other side of the frame F.

Here, the one side (a) of the frame F having the air hole 210 formed therein may refer to a portion adjacent to any one of the lateral sides of the frame F, and the other side (b) may refer to a portion opposite to the one side (a) of the frame F.

As shown in FIG. 3, the air hole 210 may be formed along the length direction of the frame F. In this case, the other side (b) may refer to the length direction of the opposite side of the frame F, and the guide unit 220 may inject air, discharged through the air hole 210, in the width direction of the frame F. As the air hole 210 is formed along the length direction of the frame F, air, which is discharged through the air hole 210 and injected between the UV light-transmitting plate P and the reactant, may form a forward direction flow with an air flow formed in the polymerization reactor. On the contrary, when the air hole 210 is formed along the width direction of the frame F, the guide unit 220 may also inject air, discharged through the air hole 210, in the length direction of the frame F. That is, the guide unit 220 may change the direction of air flow, discharged from the air hole 220 above the guide unit 220 and going downward, to the width or length direction of the frame F and inject air in the changed direction. Referring to FIG. 4, the guide unit 220 may include a guide portion 221 and a deviation preventing portion 222.

The guide portion 221 may be spaced apart from the lower surface of the frame F and may extend in a direction from the one side (a) to the other side (b) of the frame F. Specifically, the guide portion 221 may be disposed below the air hole 210 formed through the one side (a) of the frame F, and may be disposed in parallel with the frame F having the air hole 210 formed therein, so that it may inject air in a direction parallel with the frame F and the UV light-transmitting plate P accommodated in the frame F. In addition, the guide portion 221 may be inclined in a direction which becomes close to the frame (F) or away from the frame (F). The direction in which the guide portion 221 extends may be a direction in which air is injected, and may be the width or length direction of the frame F depending on the formation position of the air hole 210.

Referring to FIG. 5, the guide unit 220 may include a deviation preventing portion 222 that connects the lower surface of the frame F to the guide portion 221 so as to be capable of preventing air, discharged through the air hole 210, from deviating from the guide portion 221 in directions other than the extending direction of the guide portion 221. The deviation preventing portion 222 may form no gap between the frame F and the guide unit 220, and thus prevent air, discharged through the air hole 210, from being injected in an unwanted direction. In addition, the deviation preventing portion 222 may be used to inject all discharged air between the UV light-transmitting plate P and the reactant, thus blocking by-products from evaporating to the lower surface of the UV light-transmitting plate P.

Meanwhile, referring to FIG. 6, air injected between the UV light-transmitting plate P and the reactant R may flow into a polymerization reactor on which the photopolymerization reaction system 1000 according to the embodiment of the present disclosure is disposed, and may be discharged to the outside together with steam flow or the like through a discharge nozzle.

As described above, the photopolymerization reaction system 1000 according to the embodiment of the present disclosure has the following effects. Since a portion of air introduced to remove heat from the UV lamp 130 is injected into a space between the UV light-transmitting plate P and the reactant R by the air injection module 200 and functions as an air curtain, the injected air may block photopolymerization reaction by-products from evaporating to the lower surface of the UV light-transmitting plate P, and prevent the UV light-transmitting plate P from being contaminated by contact with the by-products.

In addition, since air supplied into the UV lamp kit to remove heat from the UV lamp is injected, energy can be saved, and the system can be simplified in that it does not require separate components that inject air to prevent contamination of the UV light-transmitting plate, for example, an air pump, a nozzle and the like.

Furthermore, since an air injection function can be embodied by forming the air hole in the frame for accommodating the UV light-transmitting plate and providing the guide unit below the air hole, the photopolymerization reaction system of the present disclosure may be easily applied to an existing photopolymerization reaction system.

Although the present disclosure has been described in connection with the preferred embodiments mentioned above, various modifications or variations are possible without departing from the subject matter and scope of the present disclosure. Therefore, the appended claims will cover such modifications and variations as fall within the subject matter of the present disclosure.

The invention claimed is:

1. A photopolymerization reaction system comprising:
a housing;
a UV lamp disposed within the housing;
a UV light-transmitting plate disposed below the UV lamp;
a frame accommodating the UV light-transmitting plate therein;
a substrate disposed below and spaced apart from the UV light-transmitting plate in a height direction of the frame such that a top surface of the substrate faces a bottom surface of the UV light-transmitting plate, the substrate oriented parallel to the UV light-transmitting plate such that a plate-shaped space extends between the substrate and the UV light-transmitting plate, the substrate disposed below the frame;
a ventilation part configured to receive supply and discharge therethrough of a first flow of air for heat removal from the UV lamp; and
an air injection module configured to inject a second flow of air into the housing between the UV light-transmitting plate and a reactant disposed on the top surface of the substrate, the second flow of air being a portion of the first flow of air, the air injection module configured to inject the second flow of air through the plate-shaped space in a width direction of the frame perpendicular to the height direction and parallel to the top surface of the substrate and the bottom surface of the UV light-transmitting plate, the air injection module being configured to prevent the UV light-transmitting plate from being contaminated by by-products generated by a photopolymerization reaction in which the reactant is disposed on the top surface of the substrate below the UV light-transmitting plate, wherein the air injection module comprises:

a plurality of air holes each extending through upper and lower surfaces of one side of the frame in the height direction, the plurality of air holes being spaced apart from one another along a length direction of the frame perpendicular to the height direction and the width direction; and a guide unit disposed below the plurality of air holes and configured to guide an injection direction of the second flow of air that is discharged through the plurality of air holes, so as to guide the second flow of air to be injected in the width direction from the one side of the frame to another side of the frame, the guide unit comprising a guide portion spaced apart in the height direction from the lower surface of the one side of the frame and extending parallel to the UV light-transmitting plate in the width direction from the one side of the frame to the another side of the frame.

2. The photopolymerization reaction system of claim 1, wherein the guide unit comprises a deviation preventing portion connecting the guide portion to the lower surface of the one side of the frame so as to prevent the second flow of air from deviating from the guide portion in directions other than the direction in which the guide portion extends.

3. The photopolymerization reaction system of claim 1, wherein the second flow of air is discharged from the photopolymerization reaction system from a location below the frame.

* * * * *